US010123177B2

(12) United States Patent
Kamino et al.

(10) Patent No.: US 10,123,177 B2
(45) Date of Patent: Nov. 6, 2018

(54) INFORMATION PROCESSING APPARATUS, CONTROL METHOD, AND PROGRAM

(71) Applicant: SONY CORPORATION, Tokyo (JP)

(72) Inventors: Eiji Kamino, Tokyo (JP); Kentaro Nakamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/545,824

(22) PCT Filed: Dec. 7, 2015

(86) PCT No.: PCT/JP2015/084291
§ 371 (c)(1),
(2) Date: Jul. 24, 2017

(87) PCT Pub. No.: WO2016/147496
PCT Pub. Date: Sep. 22, 2016

(65) Prior Publication Data
US 2018/0027381 A1   Jan. 25, 2018

(30) Foreign Application Priority Data
Mar. 19, 2015 (JP) ................................. 2015-055804

(51) Int. Cl.
H04W 4/00    (2018.01)
H04W 4/029    (2018.01)
G06Q 50/00    (2012.01)

(52) U.S. Cl.
CPC ............ *H04W 4/029* (2018.02); *G06Q 50/01* (2013.01)

(58) Field of Classification Search
CPC .............................. H04W 4/029; G06Q 50/01
See application file for complete search history.

(56) References Cited

U.S. PATENT DOCUMENTS

2007/0281690 A1* 12/2007 Altman ................. H04W 4/185
455/435.1
2009/0115617 A1* 5/2009 Sano ................. G06F 17/30241
340/573.1
(Continued)

FOREIGN PATENT DOCUMENTS

JP    2002-304455 A    10/2002
JP    2003-141682 A    5/2003
(Continued)

OTHER PUBLICATIONS

International Search Report dated Feb. 9, 2016, in PCT/JP2015/084291 filed Dec. 7, 2015.
(Continued)

*Primary Examiner* — Khai M Nguyen
(74) *Attorney, Agent, or Firm* — Xsensus, LLP (57) ABSTRACT

[Object] To provide an information processing apparatus, a control method, and a program, which are capable of reducing a psychological barrier by sharing position information in accordance with a gathering of users, and also promoting communication with another user.
[Solution] An information processing apparatus, including: an acquisition unit configured to acquire pieces of current position information of a plurality of users; and a controller configured to perform control in a manner that, in a case where it is determined that there is a gathering of the plurality of users on the basis of the pieces of current position information, a set sharer is notified of place information based on the pieces of current position information of the plurality of users.

20 Claims, 8 Drawing Sheets

(56) References Cited

U.S. PATENT DOCUMENTS

2012/0290950 A1 11/2012 Rapaport et al.
2013/0185368 A1 7/2013 Nordstrom et al.
2015/0056920 A1* 2/2015 Huttunen ................ H04B 7/26
                                                                                         455/41.2

FOREIGN PATENT DOCUMENTS

JP        2009-98446 A     5/2009
JP        2014-92942 A     5/2014

OTHER PUBLICATIONS

Extended Search Report issued in European Application 15885588.2-1218 dated Aug. 16, 2018.

* cited by examiner

INFORMATION PROCESSING APPARATUS, CONTROL METHOD, AND PROGRAM

TECHNICAL FIELD

The present invention relates to an information processing apparatus, a control method, and a program.

BACKGROUND ART

There has been proposed an application that promotes communication among friends by sharing pieces of position information with predetermined friends.

For example, the following Patent Literature 1 discloses a navigation system in which a group is constituted of multiple vehicles and position information of another vehicle within the group is shared between vehicles within the group.

CITATION LIST

Patent Literature

Patent Literature 1: JP 2003-14168A

DISCLOSURE OF INVENTION

Technical Problem

However, it has been difficult to spread a position sharing application, since there is a psychological barrier in sharing one's position information with a partner all the time even if the partner is a friend.

Further, in the case of performing position sharing, the setting of a range of friends with whom the position is shared is complicated. For example, if all the users who belong to a group are selected uniformly as the friends with whom the position is shared, there is a case where a person with whom the position is not intended to share is included in the users.

Accordingly, the present disclosure proposes an information processing apparatus, a control method, and a program, which are capable of reducing a psychological barrier by sharing position information in accordance with a gathering of users, and also promoting communication with another user.

Solution to Problem

According to the present disclosure, there is provided an information processing apparatus, including: an acquisition unit configured to acquire pieces of current position information of a plurality of users; and a controller configured to perform control in a manner that, in a case where it is determined that there is a gathering of the plurality of users on the basis of the pieces of current position information, a set sharer is notified of place information based on the pieces of current position information of the plurality of users.

According to the present disclosure, there is provided a control method including: acquiring pieces of current position information of a plurality of users; and performing control by a controller in a manner that, in a case where it is determined that there is a gathering of the plurality of users on the basis of the pieces of current position information, a set sharer is notified of place information based on the pieces of current position information of the plurality of users.

According to the present disclosure, there is provided a program for causing a computer to function as an acquisition unit configured to acquire pieces of current position information of a plurality of users, and a controller configured to perform control in a manner that, in a case where it is determined that there is a gathering of the plurality of users on the basis of the pieces of current position information, a set sharer is notified of place information based on the pieces of current position information of the plurality of users.

Advantageous Effects of Invention

As described above, according to the present disclosure, a psychological barrier can be reduced by sharing position information in accordance with a gathering of users, and communication with another user can also be promoted.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that the description will be given in the following order.
1. Overview of information processing system according to embodiment of present disclosure
2. Basic configuration
   2-1. Configuration of server
   2-2. Configuration of user terminal 3. Operation processing
4. Modified example
5. Conclusion <<1. Overview of Information Processing System According to Embodiment of Present Disclosure>>

Figure 1:
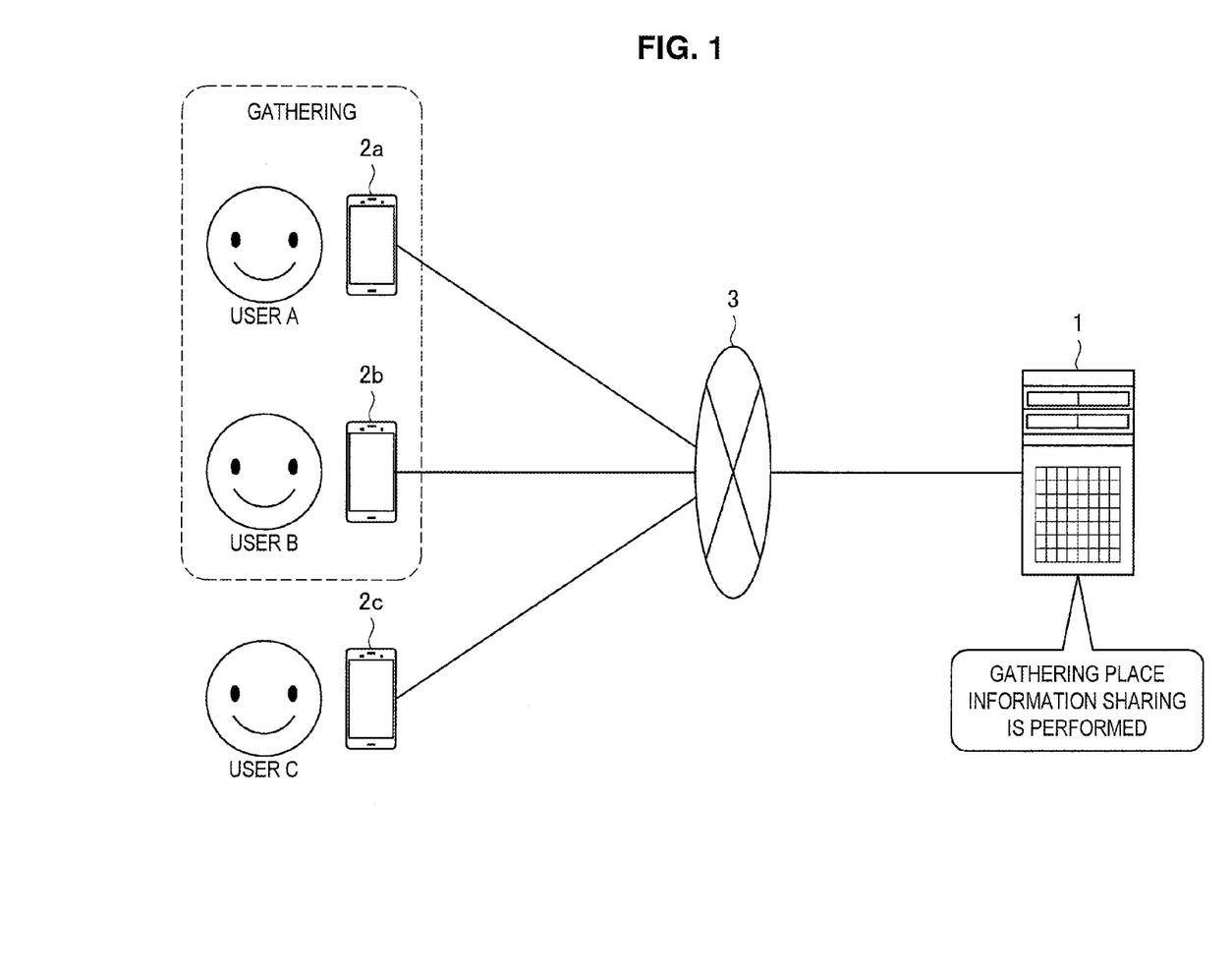
FIG. 1 is a diagram illustrating an overview of an information processing system according to an embodiment of the present disclosure.

An overview of an information processing system according to an embodiment of the present disclosure will be described with reference to FIG. 1. As shown in FIG. 1, the information processing system according to the present embodiment includes a user terminal 2 that detects position information of a user, and a server 1 that performs sharing of position information. The server 1 and the user terminal 2 are connected to each other through a network 3, for example.

In the example shown in FIG. 1, for example, in the case where a user terminal 2a held by a user A, a user terminal 2b held by a user B, and a user terminal 2c held by a user C are connected to the server 1, when the server 1 determines that the user A and the user B are gathered on the basis of the pieces of position information of the user terminals 2a and 2b, the server 1 notifies the user C, who is a sharer satisfying a predetermined condition, of position information of the place at which the user A and the user B are gathered (hereinafter, also referred to as gathering place).

(Background)

In a conventional position information sharing system, one's position information is shared with a partner all the time, and there is a psychological barrier in using the position information sharing system even if the partner is a friend. Further, it was complicated to set a partner to share the position with.

Accordingly, the information processing system according to the present embodiment can reduce a psychological barrier by sharing position information in accordance with a gathering of users, and can promote communication with another user.

That is, in the case where the user is with someone, it is assumed that the psychological barrier is reduced with respect to the fact that the place information is shared with another friend, and in addition, if the other friend can be invited to that place automatically, a convenient communication tool can be achieved.

Further, in the present embodiment, a partner with whom position information (hereinafter, also referred to as sharer) is shared is set appropriately in accordance with a relationship between users, and thus, optimum position sharing corresponding to a situation can be achieved.

Heretofore, the overview of the information processing system according to an embodiment of the present disclosure has been described. Note that the user terminal 2 is not limited to a smartphone shown in FIG. 1. For example, the user terminal 2 may be a tablet terminal, a cellular phone terminal, a personal digital assistant (PDA), a personal computer (PC), a mobile music player, a mobile game console, a behind-the-neck headset, or a wearable terminal. Subsequently, with reference to FIGS. 2 and 3, respective configurations of the server 1 and the user terminal 2 included in the information processing system according to an embodiment of the present disclosure will be described.

<<2. Basic Configuration>>

<2-1. Configuration of Server>

Figure 2:
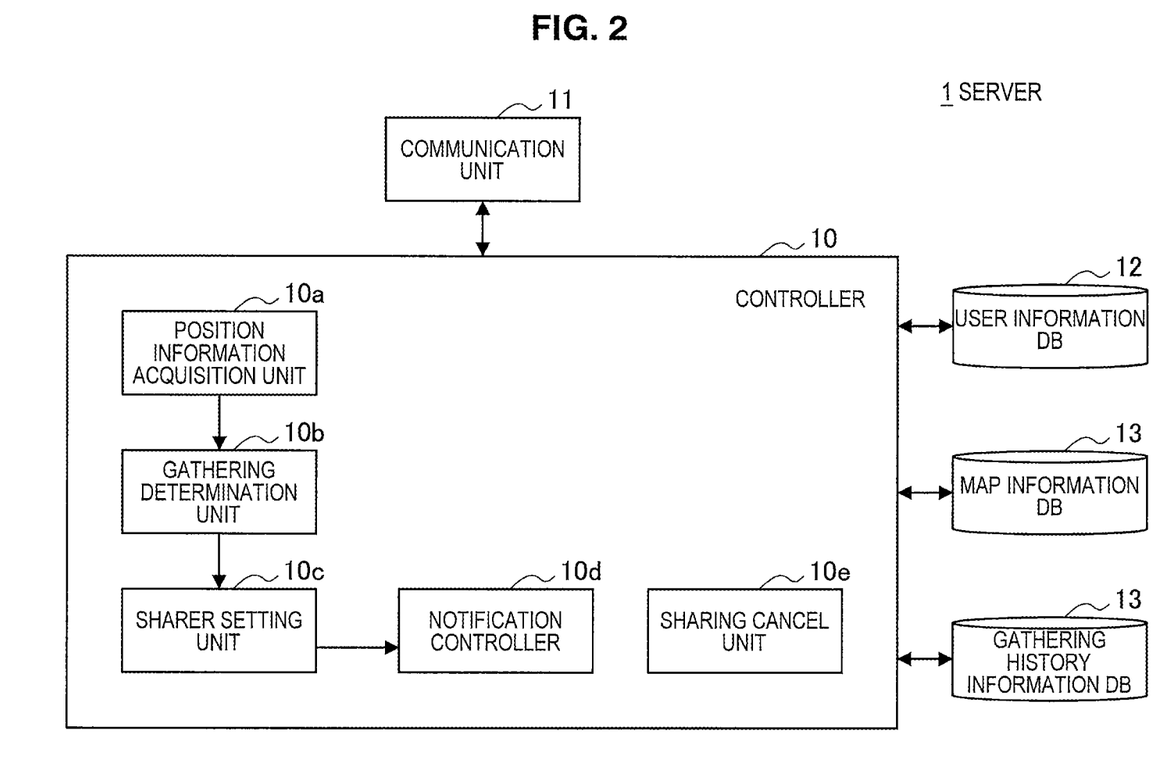
FIG. 2 is a block diagram showing an example of a configuration of a server according to the present embodiment.

FIG. 2 is a block diagram showing an example of a configuration of the server 1 according to the present embodiment. As shown in FIG. 2, the server 1 includes a controller 10, a communication unit 11, a user information database (DB) 12, a map information DB 13 and a gathering history information DB 14.

(Controller 10)

The controller 10 is configured from, for example, a microcontroller including a central processing unit (CPU), a read only memory (ROM), a random access memory (RAM), a nonvolatile memory, and an interface, and controls each constituent of the server 1. To be specific, the controller 10 according to the present embodiment functions as, as shown in FIG. 2, a position information acquisition unit 10a, a gathering determination unit 10b, a sharer setting unit 10c, a notification controller 10d, and a sharing cancel unit 10e.

The position information acquisition unit 10a acquires current position information of a user from a user terminal 2 through the communication unit 11. Note that, although the current position information is measured by the user terminal 2 in the present embodiment, the present disclosure is not limited thereto, and the current position information of the user terminal 2 in which a position information sharing setting is ON may be calculated by the server 1, that is, by the position information acquisition unit 10a, for example. Further, near field communication may be performed through Bluetooth (registered trademark) and the like between user terminals of gathered users, and the current position information may be transmitted from a representative user terminal.

The gathering determination unit 10b determines whether users are gathered on the basis of the pieces of current position information of the respective users that are acquired by the position information acquisition unit 10a. To be specific, the gathering determination unit 10b determines that the users are gathered in the case where the users are present within a predetermined area. Further, the gathering determination unit 10b may also determine there is a gathering in the case where a predetermined number of users are gathered.

The sharer setting unit 10c sets a sharer with whom gathering place information (information on a gathering place including position information of the gathering place) is shared. The setting of a sharer may be performed by referring to user information stored in the user information DB 12 and extracting a user who satisfies a predetermined condition among users registered as friends. Further, gathering history information (who and who are gathered where and when) stored in the gathering history information DB 14 may also be referred to and a user satisfying a predetermined condition may be set as a sharer.

To be specific, for example, the sharer setting unit 10c sets a sharer in accordance with a relationship between the gathered users. The relationship between the users may be determined on the basis of user information stored in the user information DB 12. For example, in the case where the relationship between the users is classmates at high school, friends at the same high school are set as sharers. Further, in the case where the relationship between the users is members of a company, friends at the same company (colleagues, bosses, subordinates) are set as sharers. Still further, in the case where the relationship between the users is members of a sports club, friends at the same sports club are set as sharers.

Moreover, the sharer setting unit 10c may set a sharer in accordance with characteristics of gathered users. The characteristics of the users are determined by referring to user information stored in the user information DB 12, and, for example, sex, age, hometown, present address, and hobby/preference are assumed as the characteristics. For example, in the case where the users are male, a male friend is set as a sharer.

Further, the sharer setting unit 10c may refer to a past gathering history of users, and may set a friend who frequently gathers with the users (to be specific, a friend whose gathering rate with the users is more than or equal to a predetermined value) as a sharer.

Further, the sharer setting unit 10c may refer to a gathering history and may set as a sharer a friend who frequently gathers with the users among users whose relationships or characteristics are common with the above-mentioned users.

In addition, the sharer setting unit 10c may also set a sharer in accordance with a place at which or a time slot in which the users are gathered. For example, the sharer setting unit 10c can set as a sharer a user who is present within a fixed distance from a gathering place on the basis of the gathering place and current position information of another user, or can set as a sharer a user who lives within a fixed distance from a gathering place on the basis of a current address of another user. Further, the sharer setting unit 10c can set as a sharer a user who belongs to an attribute in which going out is possible in a time slot on the basis of the time slot in which the users are gathered and an attribute (student, housewife, office worker, or the like) of another user, or can set as a sharer a user who can go out (gather) in the time slot on the basis of a gathering history of another user. Further, the sharer setting unit 10c can set as a sharer a user who is interested in a place on the basis of an attribute (for example, an attribute of a shop or a facility) of the place of gathering and a hobby/preference (that may be extracted from the user information DB 12 or the gathering history information DB 14) of another user.

Further, the sharer setting unit 10c may also determine whether the setting of a sharer is available and the number of persons to be set in accordance with a seat availability of a shop at which users are gathered. That is, the sharer setting unit 10c acquires information on seat availability of the shop at which the users are gathered from a server (not shown) on the network 3, and sets a sharer with whom the position information is shared in the case where the seat is available. In this way, a situation can be avoided that the gathering place is shared and a friend is invited but there is no seat in the shop for the friend.

Further, the sharer setting unit 10c may narrow down friends to be set as a sharer among the users having the above-mentioned relationship or the users who have common characteristics in accordance with a gathering place and a gathering time slot.

The notification controller 10d performs control such that the sharer set by the sharer setting unit 10c is notified of position information of a gathering place at which users are gathered. For the position information of the gathering place, any one piece of position information, or multiple pieces of position information among the respective pieces of position information of the users may be used. Further, the notification of the position information of the gathering place can be issued by, for example, transmitting a map image indicating the relevant position to the user terminal 2c of the sharer user C. In this way, in the present embodiment, in the case where the users are gathered, another user is notified of the gathering place information, and sharing of the position information is executed.

Further, in issuing the notification of the gathering place information, the notification controller 10d may also issue the notification of, in addition to the position information of the gathering place, a message that promotes gathering. For example, the notification controller 10d transmits to the sharer the message "we're drinking near you, do you want to join us?" together with the map image indicating the relevant position. Further, the notification controller 10d may also issue notification of information related to the gathering place. For example, in the case where multiple users are gathered in a pub, the notification controller 10d can also issue notification URL of the web site and a coupon of the pub additionally.

The notification of the gathering place information issued by the notification controller 10d described above is pop-up displayed on a display screen of the user terminal 2, or is displayed on a status bar located at the upper end or the like of the display screen. Further, notification controller 10d can also share the position information by writing the gathering place information on a predetermined social network. In this case, another user (that is, a set sharer) who is registered as friends on the social network can be notified of the gathering place.

Further, before notifying the sharer of the gathering place information, the notification controller 10d may issue notification that asks the gathered users whether the gathering place information may be shared with the set sharer. In this case, in the case where the notification controller 10d obtains notification permission from the users, the notification controller 10d notifies another user of the gathering place information.

Further, the notification controller 10d may notify a user that the gathering place information has been shared with the sharer.

The sharing cancel unit 10e cancels sharing of the position information. For example, in the case where a gathering of users is broken up on the basis of the position information of the gathered users, the sharing cancel unit 10e cancels the sharing of the position information. For example, the sharing cancel unit 10e deletes the notification of the gathering place information displayed on the user terminal 2 of the sharer, and deletes the writing on the social network. Further, the sharing cancel unit 10e may cancel the sharing after an elapse of a predetermined time from the sharing of the position information.

(Communication Unit 11)

The communication unit 11 has a function of being connected to an external device via wire or radio and performing data transmission/reception. The communication unit 11 according to the present embodiment is connected to the user terminal 2, receives the current position information from the user terminal 2, and transmits the gathering place information to the user terminal 2 of the sharer in accordance with the control performed by the notification controller 10d, for example.

(User Information DB 12)

The user information DB 12 is a storage that stores user information. The user information includes information on user's name, sex, age, address, school from which the user graduated from, hometown, company name, and the like. Further, the user information also includes identification information of the user terminal 2, and address information which is the destination with which the position information is shared. Further, the user information also includes friend registration information (to be specific, identification information or the like of a registered friend).

(Map Information DB 13)

The map information DB 13 is a storage that stores map information. The map information may be used when the notification controller 10d notifies a sharer of gathering place information.

(Gathering History Information DB 14)

The gathering history information DB 14 is a storage that stores gathering history information. The gathering history information includes information on a gathering of users determined by the gathering determination unit 10*b* (to be specific, pieces of identification information of the users who have gathered, date/time of the gathering, position information of the place at which the users have gathered, and the like).

Heretofore, the specific configuration of the server 1 according to the present embodiment has been described. Note that the configuration of the server 1 shown in FIG. 2 is an example, and the present embodiment is not limited thereto. For example, the user information DB 12, the map information DB 13, and the gathering history information DB 14 may be stored in an external memory on a network, not in an internal memory. Further, a configuration of at least part of the server 1 shown in FIG. 2 may be provided to the user terminal 2.

<2-2. Configuration of User Terminal>

Figure 3:
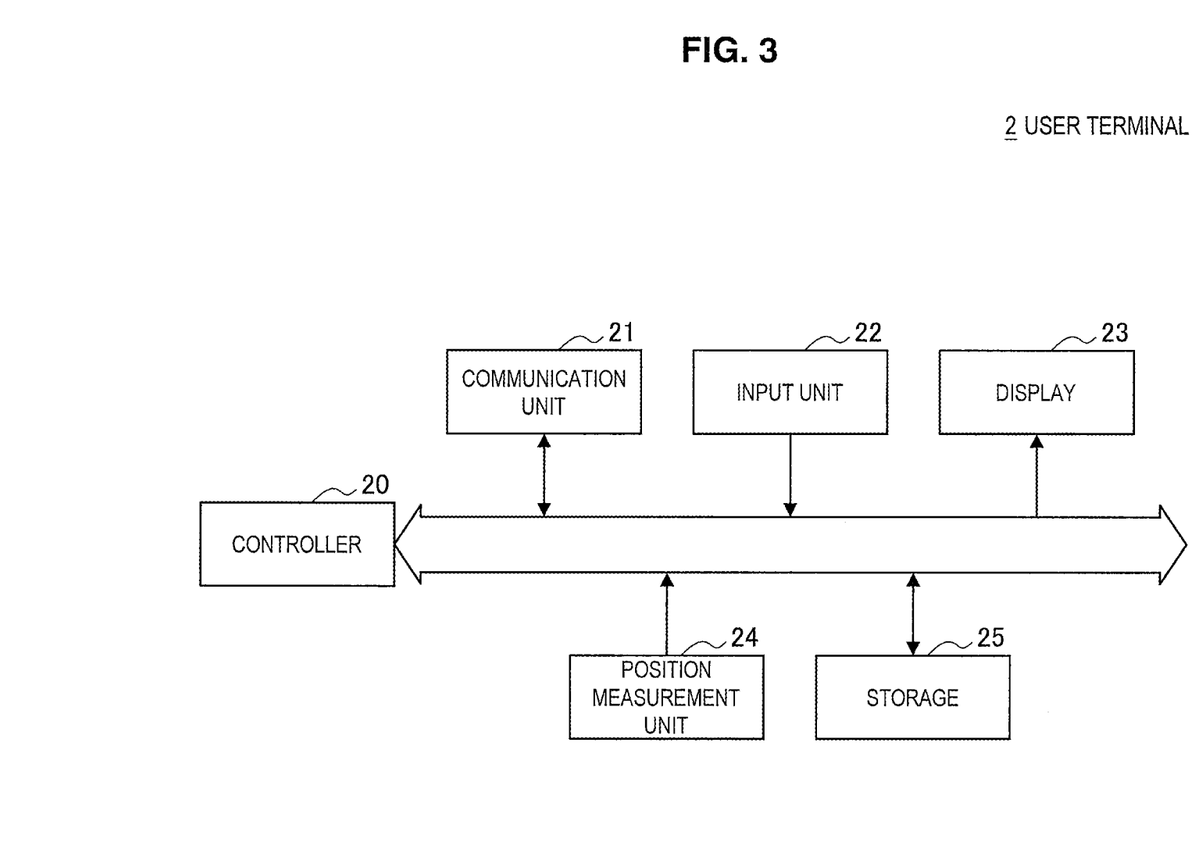
FIG. 3 is a block diagram showing an example of a configuration of a user terminal according to the present embodiment.

Next, with reference to FIG. 3, a configuration of the user terminal 2 will be described. FIG. 3 is a block diagram showing an example of a configuration of the user terminal 2 according to the present embodiment. As shown in FIG. 3, the user terminal 2 includes a controller 20, a communication unit 21, an input unit 22, a display 23, a position measurement unit 24, and a storage 25.

(Controller 20)

The controller 20 is configured from, for example, a microcontroller including a CPU, a ROM, a RAM, a non-volatile memory, and an interface, and controls each constituent of the user terminal 2. For example, the controller 20 executes various types of control in accordance with user operation input from the input unit 22. Further, the controller 20 performs control such that current position information measured by the position measurement unit 24 is transmitted to the server 1 through the communication unit 21.

Further, the controller 20 performs control such that pieces of gathering place information of users received from the server 1 are displayed on the display 23.

(Communication Unit 21)

The communication unit 21 has a function of being connected to an external device via wire or radio and performing data transmission/reception. For example, the communication unit 21 according to the present embodiment transmits current position information to the server 1, and receives gathering place information from the server 1.

(Input Unit 22)

The input unit 22 detects operation of a user, and outputs the operation as input information to the controller 20. For example, the input unit 22 may be a touch panel that detects touch operation of a user on a display screen, or may be a keyboard, a numeric keypad, a button, or a switch. Further, it is also possible to perform gesture input corresponding to a movement of a user's hand using a camera (not shown) provided to the user terminal 2. Moreover, it is also possible to perform voice input corresponding to a user's voice using a microphone (not shown) provided to the user terminal 2. Still further, the input unit 22 may also be achieved with a multiple types of input devices.

(Display 23)

The display 23 displays a text, an image, and other information. The display 23 performs display in accordance with control of the controller 20. Further, the display 23 is achieved by a liquid crystal display or the like. Moreover, the display 23 may be provided in an integrated manner with the input unit 22, and is achieved by, as shown in FIG. 1, for example, a touch panel display provided on one surface of the user terminal 2.

(Position Measurement Unit 24)

The position measurement unit 24 has a function of detecting a current position of the user terminal 2 on the basis of an externally acquired signal. To be specific, for example, the position measurement unit 24 is achieved by a global positioning system (GPS) positioning unit, receives radio waves from GPS satellites, detects a position at which the user terminal 2 is present, and outputs the detected position information to the controller 20. Further, the position measurement unit 24 may detect a position through transmission/reception to/from Wi-Fi (registered trademark), Bluetooth (registered trademark), a cellular phone/PHS/smartphone, in addition to the GPS, or through near field communication.

(Storage 25)

The storage 25 stores a program for executing various types of processing performed by the controller 20.

Heretofore, the configuration of the user terminal 2 according to the present embodiment has been described. Note that the configuration of the user terminal 2 shown in FIG. 3 is an example, and the present embodiment is not limited thereto. For example, the user terminal 2 may also be provided with a speaker, and may output notification of gathering place information through audio.

<<3. Operation Processing>>

Subsequently, with reference to FIG. 4, operation processing of the information processing system according to the present embodiment will be described specifically.

Figure 4:
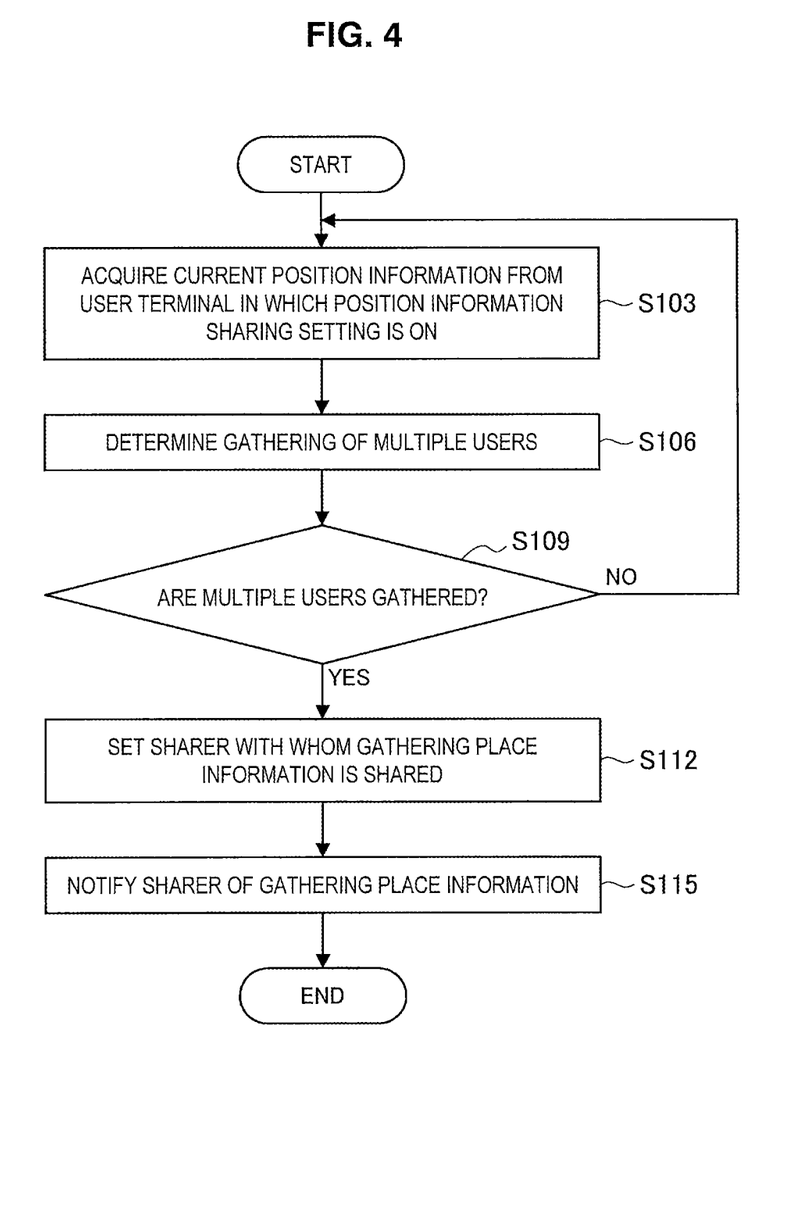
FIG. 4 is a flowchart showing gathering place information sharing processing according to the present embodiment.

FIG. 4 is a flowchart showing gathering place information sharing processing according to the present embodiment. As shown in FIG. 4, first, in Step S103, the position information acquisition unit 10*a* of the server 1 acquires current position information from a user terminal 2 in which a position information sharing setting is ON. ON/OFF of the sharing setting may be set by a user on the user terminal 2, for example.

Next, in Step S106, the gathering determination unit 10*b* of the server 1 determines a gathering of multiple users on the basis of the pieces of position information received from one or more user terminals 2*a*.

Next, in the case where it is determined that multiple users are gathered (S109/Yes), the sharer setting unit 10*c* sets a sharer with whom the gathering place information is shared in Step S112.

Then, in Step S115, the notification controller 10*d* notifies the sharer of the gathering place information and shares the position information. Notification to the sharer is achieved by being displayed on the display 23 of the user terminal 2 held by the sharer, for example. Here, with reference to FIGS. 5 to 7, an example of a display screen for performing the notification of the gathering place information will be described.

(Example 1 of Display Screen)

Figure 5:
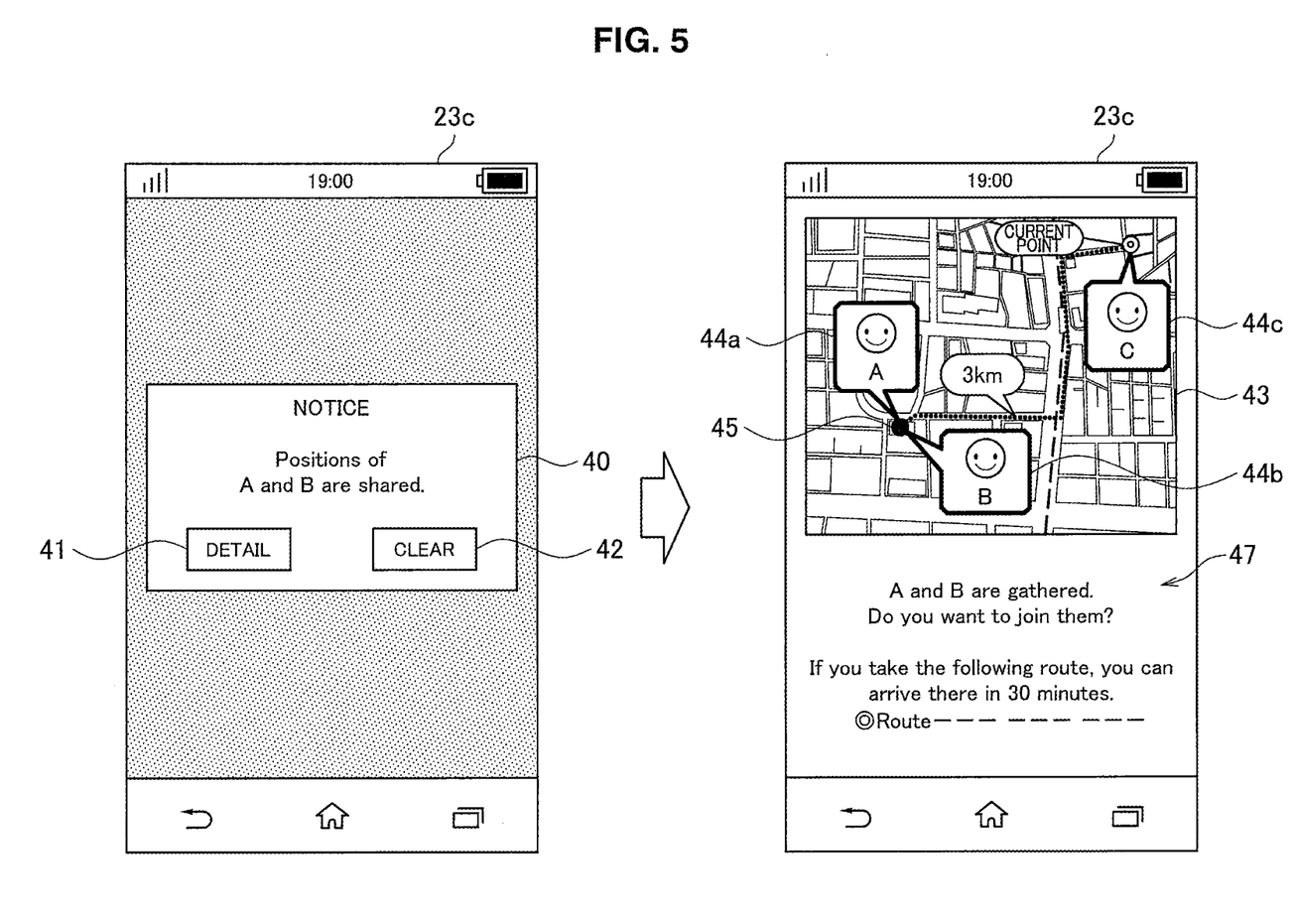
FIG. 5 is a diagram showing an example of a gathering place information notification screen according to the present embodiment.

FIG. 5 is a diagram showing an example of a gathering place information notification screen according to the present embodiment. The display screen shown in FIG. 5 is a screen displayed on the display 23*c* of the user terminal 2*c* of the user C, who is set as a sharer. On the display 23*c* of the user terminal 2*c* that has received the gathering place information from the server 1, as shown on the left side of FIG. 5, a notification image 40 is pop-up displayed. The notification image 40 includes a text of "Positions of A and B are shared", a detail button 41, and a clear button 42. When the user C selects the clear button 42, the notification image 40 is hidden.

On the other hand, when the user C selects the detail button 41, as shown on the right side of FIG. 5, the display 23*c* displays a map image 43 indicating a position of a place at which the user A and the user B are gathered, and related information 47 including a message that promotes gathering and navigation information to the gathering place. On the map image 43, an icon 45 indicating the gathering place is displayed. Further, in association with the icon 45 indicating the gathering place, user icons 44a and 44b indicating users gathering at the relevant place are displayed. In this way, the user C can intuitively grasp the place at which the user A and the user B are gathered. Further, in the example shown on the right side of FIG. 5, an icon 46 indicating a current position of the user C, a user icon 44c of the user C associated with the icon 46, and a distance between the current position of the user C and the gathering place are shown. In this way, the user C can intuitively grasp the current position of himself/herself and the distance to the gathering place.

(Example 2 of Display Screen)

Further, in sharing the gathering place information with sharer, the server 1 according to the present embodiment may perform control such that notification of confirming whether sharing with the sharer is available is issued to the user, and the sharing is performed with the sharer in the case where the user permitted the sharing. Hereinafter, with reference to FIGS. 6 and 7, examples of display screens of a user (inviting-side) terminal in the case of performing confirmation to the user and of a sharer (to-be-invited-side) terminal will be described. Here, let us assume that, as an example, the user A and the user B are gathered, and the user C is set as a sharer.

Figure 6:
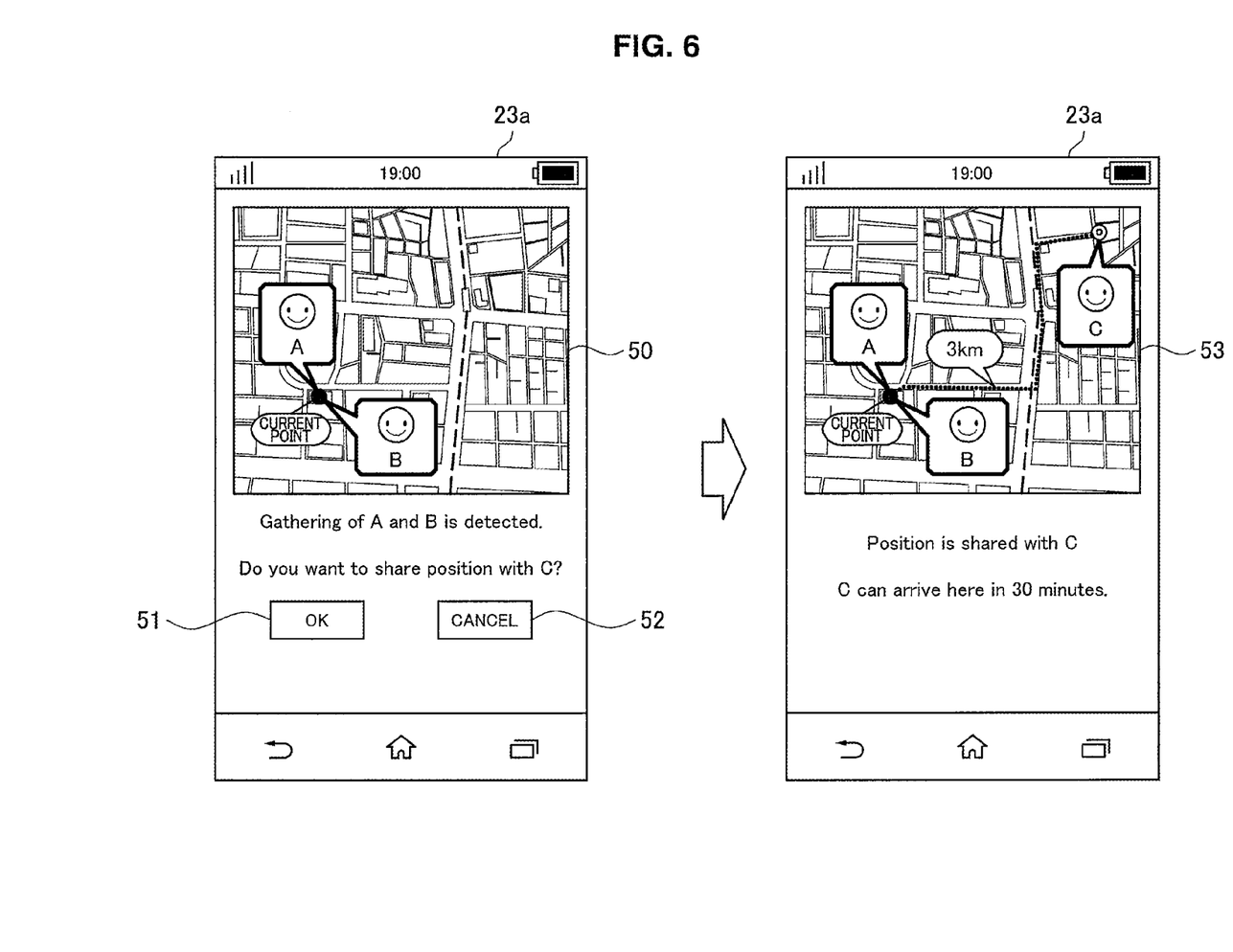
FIG. 6 is a diagram showing an example of a display screen of a user terminal at a time of confirming whether sharing is available.

FIG. 6 is a diagram showing an example of a display screen of a user terminal at a time of confirming whether sharing is available. The confirmation of whether sharing is available is performed with respect to any one of the user terminals 2 of the users who are present together, for example. FIG. 6 shows an example of a display screen of a display 23a of the user terminal 2a. As shown on the left of FIG. 6, the display 23a displays a map image 50 indicating a position of a place at which the user A and the user B are gathered, a message that confirms whether sharing is available to a sharer, an OK button 51, and a cancel button 52. On the map image 50, an icon indicating the place at which the user A and the user B are gathered, and user icons indicating the user A and the user B are displayed. Further, in the message that confirms whether sharing is available to the user, the set sharer is explicitly shown, such as "Gathering of A and B is detected. Do you want to share the position with C?"

In the case where the user A permits the sharing of the position information with the user C, the user A selects the OK button 51, and in the case where the user A does not permit the sharing of the position information with the user C, the user A selects the cancel button 52. In the case where the OK button 51 is selected, the server 1 executes the sharing of the position information with the user C. Then, in the case where the user C permits the sharing of his/her position information, as shown on the right of FIG. 6, the display 23a of the user terminal 2a displays the position information of the user C, a distance between the gathering place and the user C, and an estimated arrival time. In this way, the user A and the user B can intuitively grasp that they have performed the position sharing with the user C, the current position of the user C, and the distance between the user C and the gathering place.

Note that, in the example shown in FIG. 6, the notification for confirming the position information sharing is issued to the user terminal 2 of a representative user by the server 1, but the present embodiment is not limited thereto. For example, the server 1 may issue the notification to each of the user terminals 2 of the respective gathered users, and the server 1 may perform control such that the gathering place information sharing is performed in the case where the server 1 receives permission from each of all the users.

Figure 7:
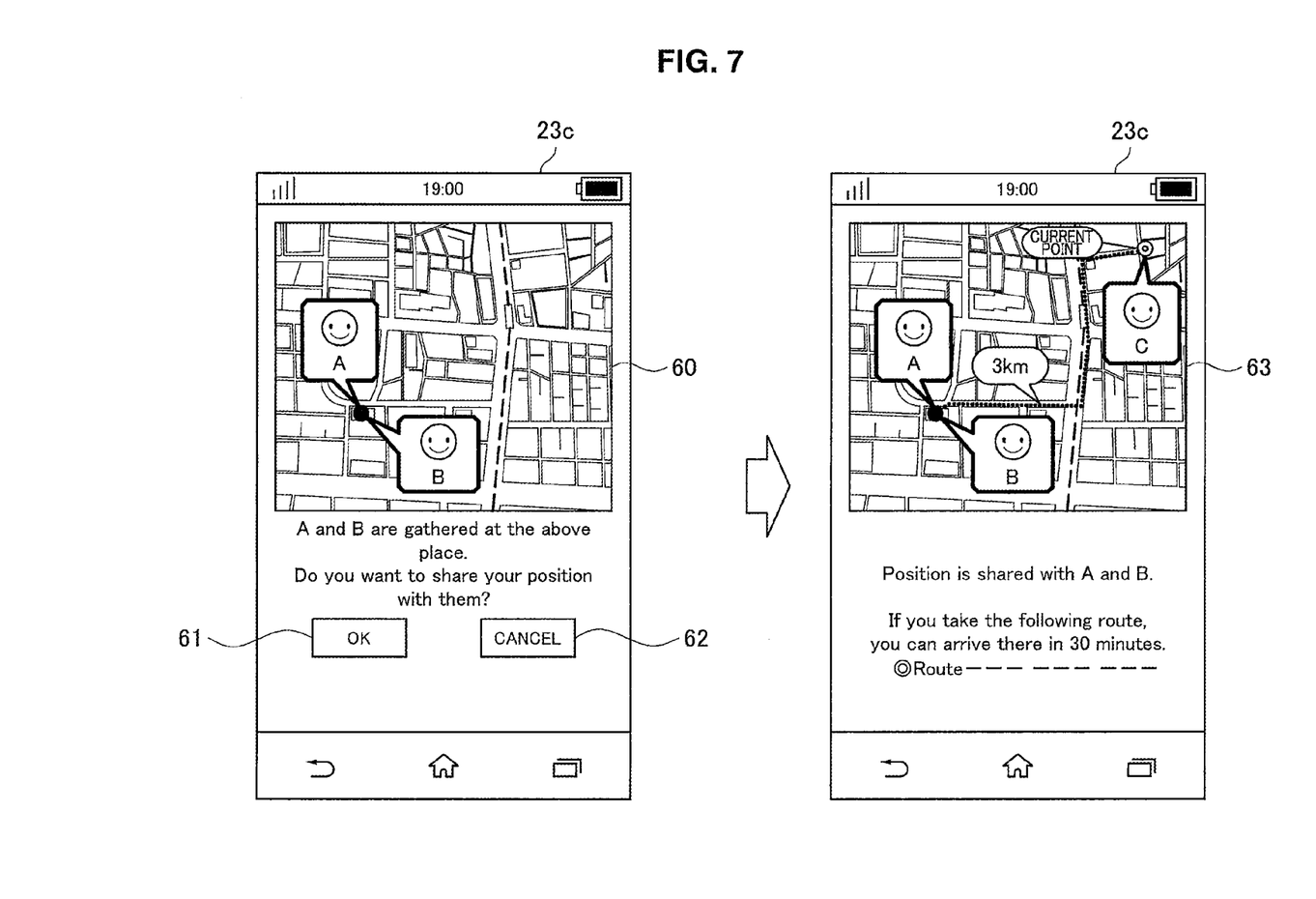
FIG. 7 is a diagram showing an example of a display screen of a terminal of a sharer with which a gathering place is shared.

Subsequently, with reference to FIG. 7, a display example at the side with which the gathering place information is shared will be described. FIG. 7 is a diagram showing an example of a display screen of a terminal of a sharer with which a gathering place is shared. FIG. 7 shows an example of a display screen of a display 23c of the user terminal 2c. As shown on the left of FIG. 7, the display 23c displays a map image 60 indicating a gathering place of the user A and the user B, a message that invites the user C to the gathering place, an OK button 61, and a cancel button 62. In this way, the user C can intuitively grasp that the user A and the user B are gathered and the gathering place, and the gathering place information is shared with the user C. Further, it is also possible to share the position information of the user C with the gathering people, for example. In the case where the user C shares his/her position information with the user A and the user B, the user C selects the OK button 61, and in the case where the user C does not share his/her position information with the user A and the user B, the user C selects the cancel button 62.

In the case where the OK button 61 is selected, the server 1 executes the sharing of the position information of the user C with the user A and the user B. Then, as shown on the right of FIG. 7, the display 23c of the user terminal 2c of the user C displays a map image 63 indicating the position information of the user C and a distance between the gathering place and the user C. Further, the display 23c displays that the position sharing with the user A and the user C has been performed and navigation information (including estimated arrival time) to the gathering place.

<<4. Modified Example>>

In the embodiment described above, one piece of position information indicating the gathering place is shared with the set sharer, but the present embodiment is not limited thereto, and pieces of position information of the respective gathered users may be shared with the sharer. Hereinafter, description will be given specifically with reference to FIG. 8.

Figure 8:
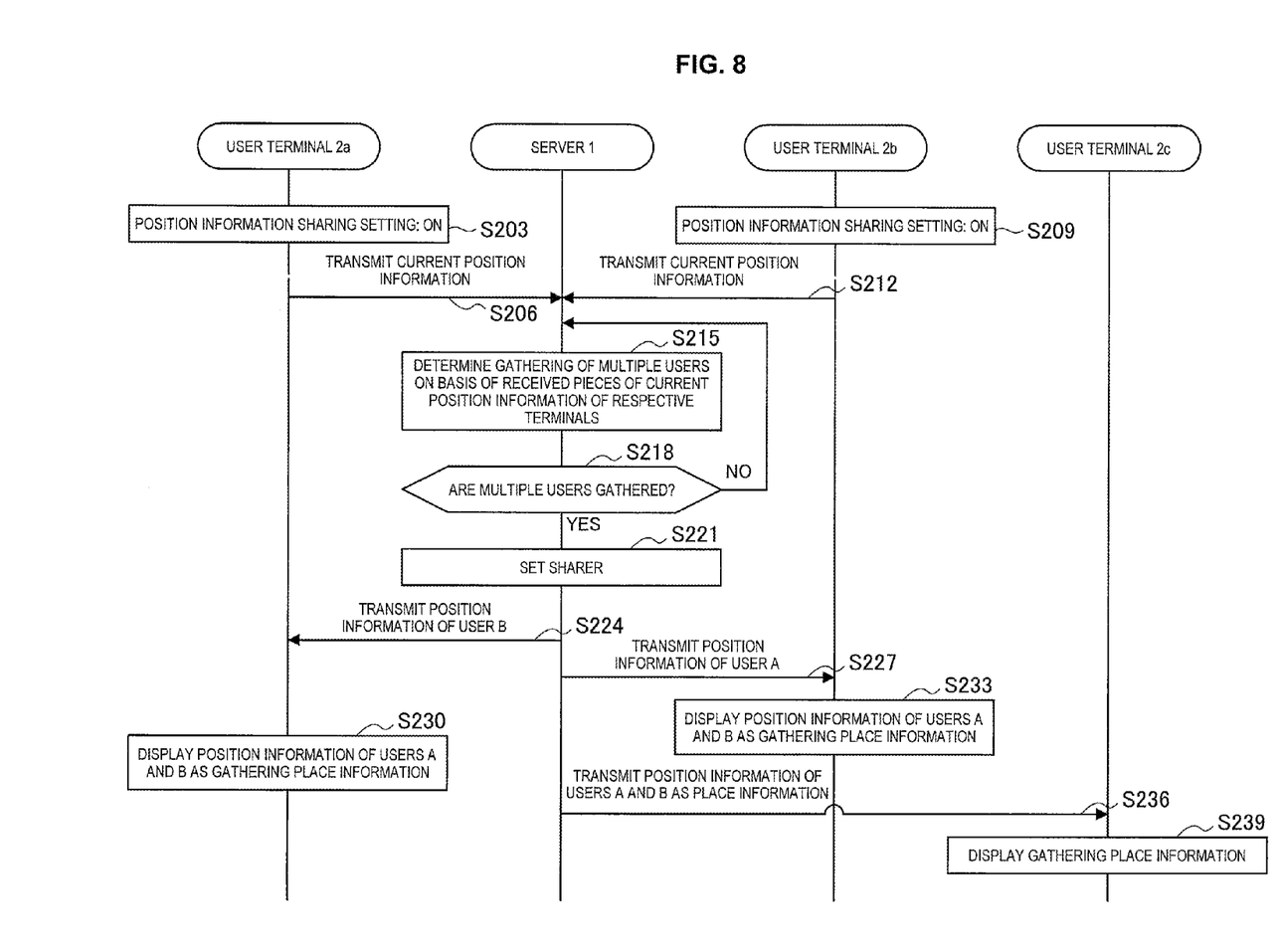
FIG. 8 is a sequence diagram showing gathering place information sharing processing according to a modified example of the present embodiment.

FIG. 8 is a sequence diagram showing gathering place information sharing processing according to a modified example of the present embodiment. As shown in FIG. 8, first, in the case where a position information sharing setting is turned on through user operation (S203), the user terminal 2a continuously measures current positions, and transmits current position information to the server 1 (S206).

Further, also in the user terminal 2c, in the case where the position information sharing setting is turned on through user operation (S209), the user terminal 2c continuously measures current positions, and transmits current position information to the server 1 (S212).

Subsequently, the gathering determination unit 10b of the server 1 determines the gathering of multiple users on the basis of the received pieces of current position information of the respective terminals (S215). For example, in the case where the position information of the user terminal 2a of the user A and the position information of the user terminal 2b of the user B indicate the same place, the gathering determination unit 10b determines that the user A and the user B are gathered.

Next, in the case where it is determined that multiple users are gathered (S218/Yes), the sharer setting unit 10c of the server 1 sets a sharer (S221). For example, the sharer setting unit 10c sets a sharer in accordance with a relationship between the multiple gathered users.

Subsequently, the notification controller 10d of the server 1 causes the gathered users to share the respective pieces of position information with each other. To be specific, the notification controller 10d transmits the position information of the user B to the user terminal 2a of the user A (S224), and transmits the position information of the user A to the user terminal 2b of the user B (S227).

Next, the user terminal 2a displays on the display 23a the position information of the user B and the position information of the user A as the gathering place information (S230). For example, on a map image, icons indicating the respective pieces of position information are displayed. Since the user A and the user B are gathered, the pieces of position information may be displayed in the vicinity to each other.

Further, in the similar manner, the user terminal 2b displays on the display 23b the position information of the user A and the position information of the user B as the gathering place information (S233).

Subsequently, the notification controller 10d of the server 1 transmits, as the gathering place information, the pieces of position information of the user A and the user B to the user terminal 2c of the user C who is set as a sharer (S236).

Then, the user terminal 2c displays on the display 23c the position information of the user A and the position information of the user B as the gathering place information (S239).

As described above, in the position sharing processing according to the modified example of the present embodiment, the pieces of position information of the respective gathered users can be shared with each other and with the sharer.

<<5. Conclusion>>

As described above, the information processing system according to an embodiment of the present disclosure can reduce a psychological barrier by sharing position information in accordance with a gathering of users, and also can promote communication with another user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, it is also possible to create a program for causing hardware such as a CPU, a ROM, and a RAM, which are built in the server 1 or the user terminal 2, to exhibit the function of the server 1 or the user terminal 2. Further, there is also provided a computer-readable storage medium having the program stored therein.

Further, the position information used in determining the gathering of users may be transmitted from a fixed camera or the like as current position information of a person to the server 1, in the case where the fixed camera or the like performs personal recognition on the persons who are present at that place and recognizes the person, not limited to the case where the user terminals 2 held by the respective users detect the position information.

Further, the user terminal 2 may have each constituent of the server 1 shown in FIG. 2. For example, the user terminal 2 is capable of performing control such that the user terminal 2 detects a gathering through near field communication with a user terminal 2 of a friend who is present in the vicinity, sets a sharer, and notifies the sharer of current position information as gathering place information.

Further, the effects described in this specification are merely illustrative or exemplified effects. and are not limitative. That is, with or in the place of the above effects, the technology according to the present disclosure may achieve other effects that are clear to those skilled in the art from the description of this specification.

Additionally, the present technology may also be configured as below.

(1)
An information processing apparatus, including:
an acquisition unit configured to acquire pieces of current position information of a plurality of users; and
a controller configured to perform control in a manner that, in a case where it is determined that there is a gathering of the plurality of users on the basis of the pieces of current position information, a set sharer is notified of place information based on the pieces of current position information of the plurality of users.

(2)
The information processing apparatus according to (1), in which,
in a case where the plurality of users are located within a predetermined area, the controller determines that there is a gathering of a plurality of users.

(3)
The information processing apparatus according to (1) or (2), in which
the place information is any one of the pieces of current position information of the respective plurality of users.

(4)
The information processing apparatus according to any one of (1) to (3), in which
the controller sets a sharer in accordance with a relationship between the plurality of users.

(5)
The information processing apparatus according to any one of (1) to (4), in which
the controller sets as a sharer a user having a gathering rate with the plurality of users of more than or equal to a predetermined value on the basis of gathering histories of the respective users.

(6)
The information processing apparatus according to any one of (1) to (5), in which
the controller sets a sharer in accordance with characteristics of the plurality of users.

(7)
The information processing apparatus according to any one of (1) to (6), in which
the controller sets a sharer who is present within a fixed distance from a place at which the plurality of users are gathered.

(8)
The information processing apparatus according to any one of (1) to (7), in which
the controller sets a sharer in accordance with a time slot in which the plurality of users are gathered.

(9)
The information processing apparatus according to any one of (1) to (8), in which
the controller sets a sharer in accordance with an attribute of a place at which the plurality of users are gathered.

(10)
The information processing apparatus according to any one of (1) to (9), in which the controller performs control in a manner that notification of the place information is issued on a social network which is open to the sharer.

(11)

The information processing apparatus according to any one of (1) to (10), in which the controller performs control in a manner that notification of, in addition to the place information, a message that promotes gathering is issued to the set sharer.

(12)

The information processing apparatus according to any one of (1) to (11), in which the controller performs control in a manner that notification of map information indicating the place is issued to the set sharer in addition to the place information.

(13)

The information processing apparatus according to any one of (1) to (12), in which the controller performs control in a manner that notification of coupon information of a shop shown in the place information is issued to the set sharer in addition to the place information.

(14)

The information processing apparatus according to any one of (1) to (13), in which the controller performs control in a manner that notification of the place information is issued in accordance with seat availability of a shop shown in the place information.

(15)

The information processing apparatus according to any one of (1) to (14), in which the controller performs control in a manner that the plurality of users confirm whether to issue the notification of the place information.

(16)

The information processing apparatus according to any one of (1) to (15), in which, in a case where the gathering of the plurality of users is broken up after the notification of the place information, the controller performs control in a manner that the notification of the place information is canceled.

(17)

The information processing apparatus according to any one of (1) to (16), in which the controller performs control in a manner that the notification of the place information is canceled after an elapse of a predetermined time from the notification of the place information.

(18)

A control method including:

acquiring pieces of current position information of a plurality of users; and performing control by a controller in a manner that, in a case where it is determined that there is a gathering of the plurality of users on the basis of the pieces of current position information, a set sharer is notified of place information based on the pieces of current position information of the plurality of users.

(19)

A program for causing a computer to function as an acquisition unit configured to acquire pieces of current position information of a plurality of users, and a controller configured to perform control in a manner that, in a case where it is determined that there is a gathering of the plurality of users on the basis of the pieces of current position information, a set sharer is notified of place information based on the pieces of current position information of the plurality of users.

REFERENCE SIGNS LIST 1 server
10 controller
10a position information acquisition unit
10b gathering determination unit
10c sharer setting unit
10d notification controller
10e sharing cancel unit
11 communication unit
12 user information DB
13 map information DB
14 gathering history information DB
2 user terminal
20 controller
21 communication unit
22 input unit
23 display
24 position measurement unit
25 storage

The invention claimed is:

1. An information processing apparatus, comprising:
circuitry configured to:
receive current position information of each of a plurality of users;
determine whether at least two of the plurality of users are gathering or not, based on the current position information of the plurality of users; and
upon determining that the at least two of the plurality of users are gathering, switch to share place information with a first user belonging to a sharing group with the at least two of the plurality of users, based on the current positon information of the at least two of the plurality of users.

2. The information processing apparatus according to claim 1,
wherein if the at least two of the plurality of users are located within a predetermined area, the circuitry determines that the at least two of the plurality of users are gathering.

3. The information processing apparatus according to claim 1,
wherein the place information is one of the current position information of each of the at least two of the plurality of users.

4. The information processing apparatus according to claim 1,
wherein the circuitry is configured to manage the sharing group in accordance with a relationship between the plurality of users.

5. The information processing apparatus according to claim 1,
wherein the circuitry is configured to manage the sharing group based on history information related to at least one of time, location, and members of gathering situation among the plurality of users in which more than a predetermined number of the plurality of users gathered in the past,
wherein the circuitry is configured to set the first user as a member of the sharing group if a gathering rate between the users of the sharing group and the first user exceeds a predetermined value based on the history information.

6. The information processing apparatus according to claim 1,
wherein the circuitry is configured to set the first user as a member of the sharing group in accordance with characteristics of the at least two if the plurality of users.

7. The information processing apparatus according to claim 1,
wherein the circuitry is configured to set the first user as a member of the sharing group if the first user is located within a predetermined distance from a location where the at least two of the plurality of users are gathering.

8. The information processing apparatus according to claim 1,
wherein the circuitry is configured to set the first user as a member of the sharing group in accordance with a time slot in which the at least two of the plurality of users are gathering.

9. The information processing apparatus according to claim 1,
wherein the circuitry is configured to set the first user as a member of the sharing group in accordance with an attribute of a location at which the at least two of the plurality of users are gathering.

10. The information processing apparatus according to claim 1,
wherein the circuitry is configured to notify the first user of the place information on a social network service platform of the first user.

11. The information processing apparatus according to claim 1,
wherein the circuitry is configured to send a message to the first user, in which the message is related to promote gathering, in addition to share the place information with the first user.

12. The information processing apparatus according to claim 1,
wherein the circuitry is configured to include map information in the place information, upon sharing the place information with the first user.

13. The information processing apparatus according to claim 1,
wherein the circuitry is configured to send coupon information of a facility related to a location where the at least two of the plurality of users are gathering, in addition to share the place information with the first user.

14. The information processing apparatus according to claim 1,
wherein the circuitry is configured to notify the first user of seat availability of a facility related to a location where the at least two of the plurality of users are gathering, in addition to share the place information with the first user.

15. The information processing apparatus according to claim 1,
wherein the circuitry is configured to obtain permission from the at least two of the plurality of the users to share the current position information with the first user, in advance to share the place information with the first user.

16. The information processing apparatus according to claim 1,
wherein the circuitry is configured to reset the sharing group and stop sharing the place information with the first user, if the at least two of the plurality of users has no longer been gathering.

17. The information processing apparatus according to claim 1,
wherein the circuitry is configured to reset the sharing group and stop sharing the place information with the first user after an elapse of a predetermined time from starting to share the place information.

18. The information processing apparatus according to claim 1,
wherein the circuitry is configured to receive the current position information of at least one the plurality of users by an image sensor installed in a certain location, in which the image sensor is configured to determine that the at least one of the plurality of users is present on the location based on image recognition of the at least one of the plurality of users.

19. A control method comprising:
receiving current position information of each of a plurality of users;
determining whether at least two of the plurality of users are gathering or not, based on the current position information of the plurality of users; and
upon determining that the at least two of the plurality of users are gathering, switch to share place information with a first user belonging to a sharing group with the at least two of the plurality of users, based on the current positon information of the at least two of the plurality of users.

20. A non-transitory computer-readable recording medium having recorded thereon a program for controlling an information processing apparatus, the program causing the information processing apparatus to execute a process, the process comprising the steps of:
receiving current position information of each of a plurality of users;
determining whether at least two of the plurality of users are gathering or not, based on the current position information of the plurality of users; and
upon determining that the at least two of the plurality of users are gathering, switch to share place information with a first user belonging to a sharing group with the at least two of the plurality of users, based on the current positon information of the at least two of the plurality of users.

* * * * *